United States Patent
Kegin

(10) Patent No.: US 11,754,069 B2
(45) Date of Patent: Sep. 12, 2023

(54) LUBRICATOR FOR BYPASS PLUNGER

(71) Applicant: Tri-Lift Services, Inc., Crescent, OK (US)

(72) Inventor: Kevin Kegin, Crescent, OK (US)

(73) Assignee: Tri-Lift Services, Inc., Crescent, OK (US)

( * ) Notice: Subject to any disclaimer, the term of this patent is extended or adjusted under 35 U.S.C. 154(b) by 1026 days.

(21) Appl. No.: 16/548,154

(22) Filed: Aug. 22, 2019

(65) Prior Publication Data

US 2021/0054839 A1 Feb. 25, 2021

(51) Int. Cl.
| | |
|---|---|
| F04B 47/12 | (2006.01) |
| F04B 53/14 | (2006.01) |
| E21B 34/02 | (2006.01) |
| E21B 43/12 | (2006.01) |
| F04B 39/00 | (2006.01) |
| F16N 11/04 | (2006.01) |

(52) U.S. Cl.
CPC ............ *F04B 53/145* (2013.01); *E21B 34/02* (2013.01); *F04B 47/12* (2013.01); *E21B 43/12* (2013.01); *E21B 43/121* (2013.01); *F04B 39/0016* (2013.01); *F16N 11/04* (2013.01)

(58) Field of Classification Search
CPC ........ E21B 34/02; E21B 43/12; E21B 43/121; F04B 39/0016; F04B 47/12; F04B 53/125; F04B 53/145; F04B 53/18; F16N 11/04; F16N 2210/02; F16N 2210/14; F16N 39/002; F16N 7/385
See application file for complete search history.

(56) References Cited

U.S. PATENT DOCUMENTS

| | | | | |
|---|---|---|---|---|
| 5,253,713 A | * | 10/1993 | Gregg | F04B 47/12 166/70 |
| 10,753,186 B1 | * | 8/2020 | Zimmerman, Jr. | E21B 43/13 |
| 2006/0108126 A1 | * | 5/2006 | Horn | E21B 43/121 166/105 |
| 2009/0032243 A1 | * | 2/2009 | Victor | E21B 33/03 267/153 |
| 2009/0188673 A1 | * | 7/2009 | Hearn | F04B 47/12 166/372 |
| 2011/0073322 A1 | * | 3/2011 | Smith | F04B 47/12 166/112 |
| 2012/0132437 A1 | * | 5/2012 | Gong et al. | E21B 43/121 166/372 |
| 2017/0107800 A1 | * | 4/2017 | Townsend | E21B 47/008 |
| 2017/0183945 A1 | * | 6/2017 | Tolman | E21B 47/09 |
| 2018/0100381 A1 | * | 4/2018 | Agarwal | F04B 53/14 |

(Continued)

*Primary Examiner* — Daniel P Stephenson
(74) *Attorney, Agent, or Firm* — Dunlap Codding, P.C.

(57) ABSTRACT

A lubricator for a plunger lift system includes a tubular body, a shift rod housing, a first spring, and a second spring. The shift rod housing disposed in the tubular body and has a chamber. The shift rod has a first portion slidably disposed in the chamber and a second portion projecting from a first end of the shift rod housing. A distal end of the second portion of the shift rod is engageable with a shift valve of a bypass plunger. The first spring disposed in the chamber to absorb an impact force applied to the shift rod by the shift valve. The second spring disposed in the tubular body between a portion of the shift rod housing and a portion of the tubular body to absorb an impact force applied to the shift rod housing by a plunger body of the bypass plunger.

16 Claims, 5 Drawing Sheets

(56) References Cited

U.S. PATENT DOCUMENTS

| | | | |
|---|---|---|---|
| 2020/0182401 A1* | 6/2020 | Eisses | F16N 7/385 |
| 2021/0054711 A1* | 2/2021 | Kegin | E21B 31/20 |
| 2021/0054839 A1* | 2/2021 | Kegin | F04B 47/12 |
| 2021/0079911 A1* | 3/2021 | Boyd | F04B 47/12 |

* cited by examiner

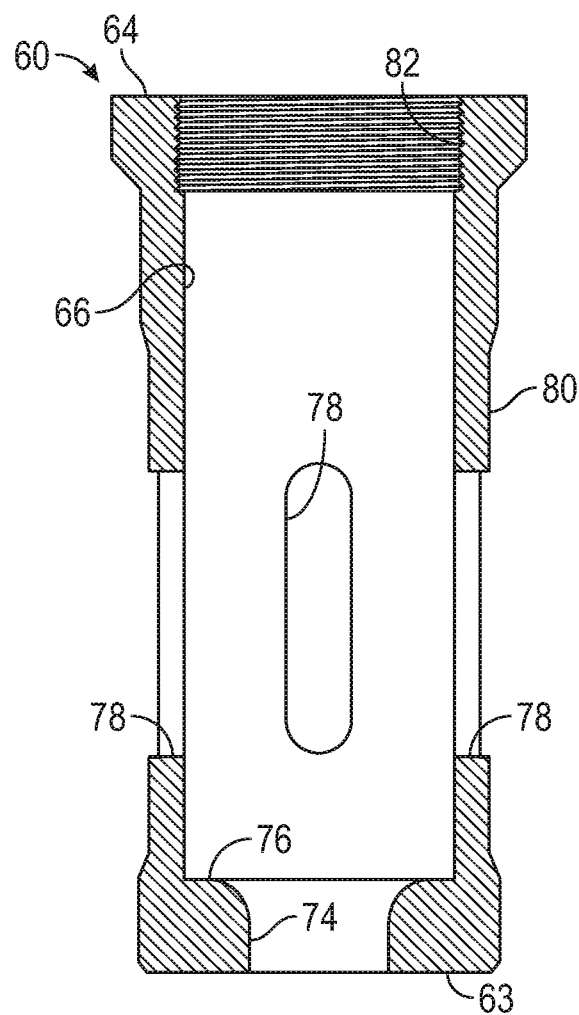 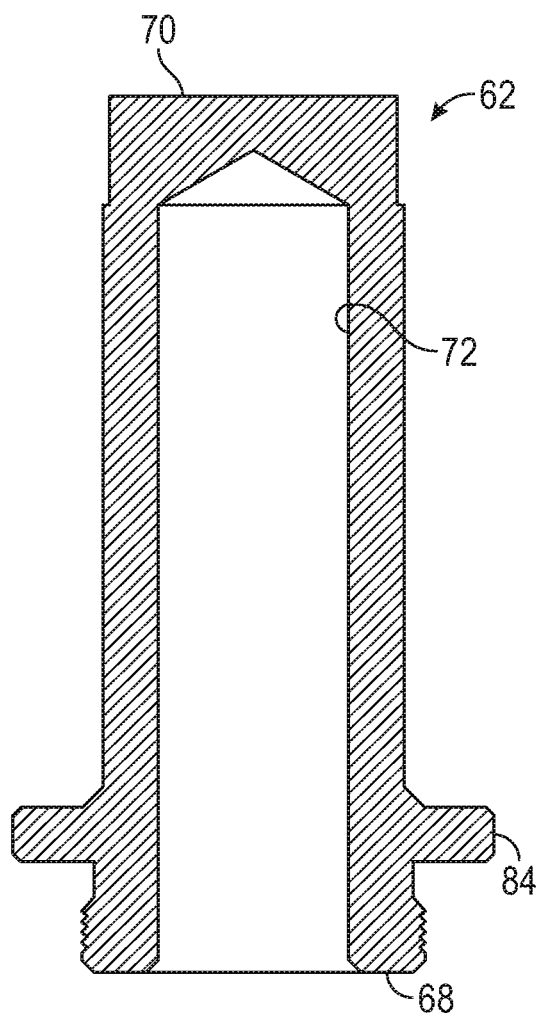
FIG. 3  FIG. 4
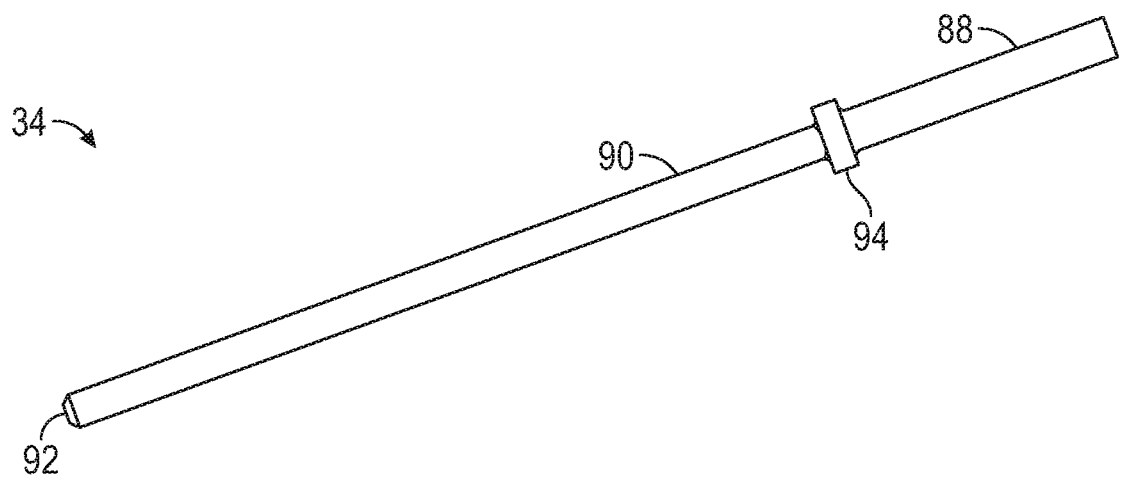
FIG. 5

LUBRICATOR FOR BYPASS PLUNGER

BACKGROUND

Plunger lift systems are used in oil and gas wells when the bottom hole pressure decreases to a point fluid cannot be effectively lifted to the surface. A plunger lift system utilizes a plunger, which is a piston-like object. The plunger is placed inside the production tubing and by controlling the pressure in the production tubing, the plunger is caused to move up and down the tubing. A valve at the surface is operated to control the pressure. When the valve is closed, the pressure increases so when the valve is opened, the plunger is caused to rise to the top carrying the fluids to the surface. When the valve is closed, the plunger returns to the bottom.

A lubricator is a piping arrangement installed at the surface to capture the plunger when the plunger is in the top position. The lubricator includes fluid outlets connected to surface piping and a bumper spring. The bumper spring absorbs the impact force of the plunger upon the plunger arriving at the top position. The lubricator may include one or more catchers adapted to selectively hold the plunger within the lubricator.

A bypass plunger is a type of plunger with a shift valve, which when open, allows fluid to pass through the plunger and increase the velocity of the plunger as the plunger travels down the tubing. In one version of a bypass plunger, the shift valve is caused to open by contact with a shift rod incorporated as part of the lubricator. The shift rod extends downwardly. The plunger passes over the shift rod as the plunger reaches the lubricator causing the shift rod to move the shift valve to the open position.

A problem encountered with the use of bypass plungers with a shift valve is the upward velocity of the plunger and cause damage to the bumper spring of the lubricator. Currently, lubricators incorporate a single spring arranged to absorb the impact of the body of the plunger without accounting for the initial impact of the shift valve to the shift rod. A second version employs two springs—one to absorb the impact to the shift rod and another to absorb the impact by the body of the plunger. With the two spring version, the springs are arranged so both springs are compressed upon impact of the body of the plunger. The repeated compression of the springs in both versions can cause the springs, the shift rod, the plunger, or all to wear prematurely.

A need exists for an improved lubricator capable of withstanding the impact forces from the shift valve on the shift rod and the plunger body on the lubricator. It is to such an apparatus that the inventive concepts disclosed herein are directed.

BRIEF DESCRIPTION OF DRAWINGS

FIG. 3 is a sectional view of a body portion of a shift rod housing.

FIG. 4 is a sectional view of a cap portion of the shift rod housing.

FIG. 5 is a perspective view of a shift rod.

DETAILED DESCRIPTION OF EXEMPLARY EMBODIMENTS

Figure 1:
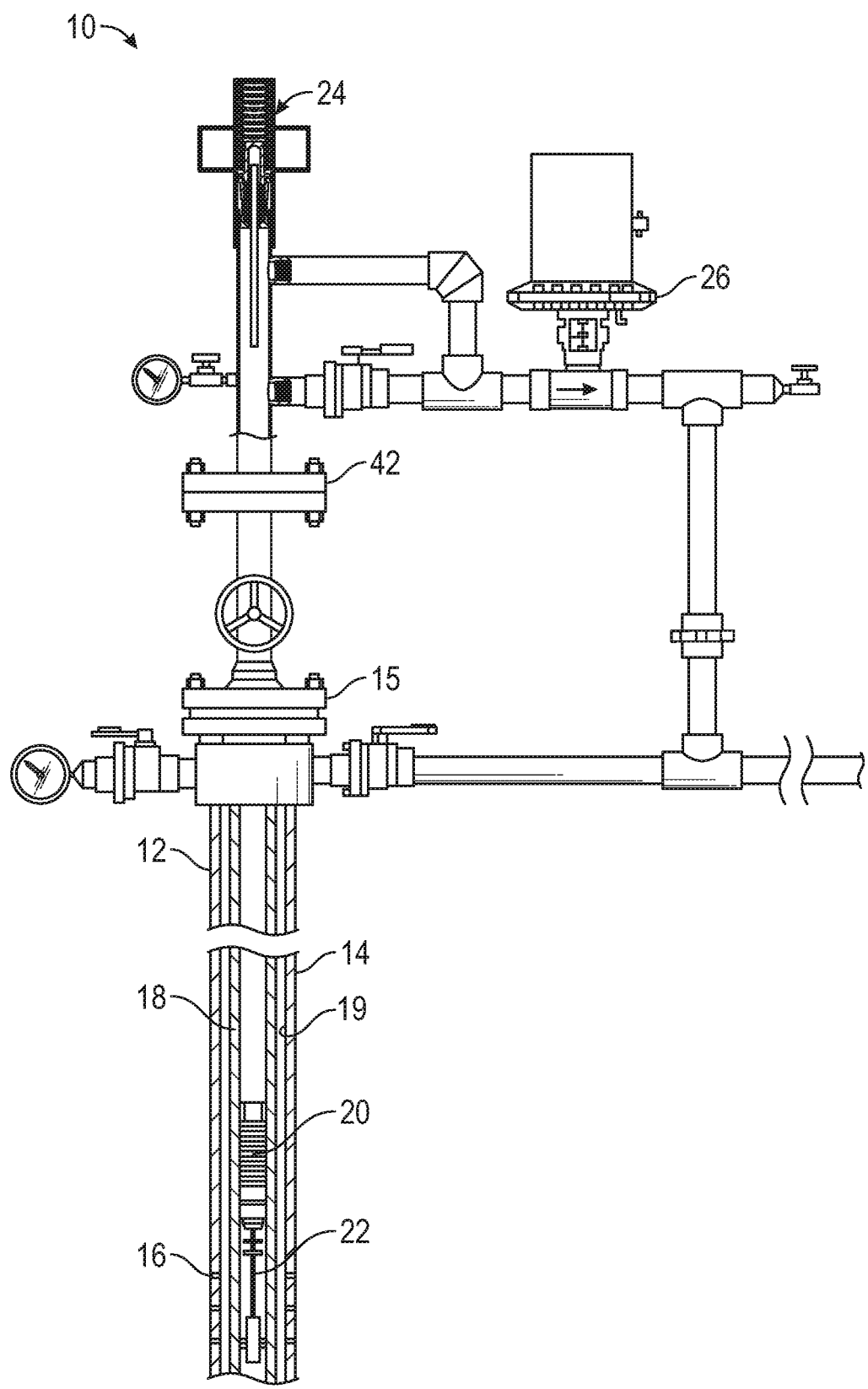
FIG. 1 is an exemplary view of a plunger lift system for removing fluid from a well bore illustrating a bypass plunger at the bottom of the well bore.

The inventive concepts disclosed are generally directed to a lubricator for a plunger lift system that includes a tubular body, a shift rod housing, a shift rod, a first spring, and a second spring. The tubular body has a sidewall and a closed end. The shift rod housing is disposed in the tubular body and has a chamber, a first end, and a second end. The shift rod has a first portion which is slidably disposed in the chamber of the shift rod housing and a second portion projecting from the first end of the shift rod housing. A distal end of the second portion of the shift rod is engageable with a shift valve of a bypass plunger. The first spring is disposed in the chamber of the shift rod housing in a way to absorb an impact force applied to the shift rod by the shift valve of the bypass plunger. The second spring is disposed in the tubular body between a portion of the shift rod housing and a portion of the tubular body in a way to absorb an impact force applied to the shift rod housing by a plunger body of the bypass plunger.

In another version, the inventive concepts disclosed are directed to a shift rod assembly for a plunger lift system including a shift rod housing, a shift rod, a first spring, and a second spring. The shift rod housing is disposable in a tubular body of a lubricator and has a chamber, a first end, and a second end. The shift rod housing has a first portion slidably disposed in the chamber of the shift rod housing and a second portion projecting from the first end of the shift rod housing. A distal end of the second portion of the shift rod is engageable with a shift valve of a bypass plunger. The first spring is disposed in the chamber of the shift rod housing between the first portion of the shift rod and the second end of the shift rod housing in a way to absorb an impact force applied to the shift rod by the shift valve of the bypass plunger. The second spring is disposable between a portion of the shift rod housing and a portion of the tubular body of the lubricator in a way to absorb an impact force applied to the shift rod housing by a plunger body of the bypass plunger.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments, or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having," and any variations thereof, are intended to cover a non-exclusive inclusion. For example, a process, method, article, or apparatus that comprises a list of elements is not necessarily limited to only those elements, and may include other elements not expressly listed or inherently present therein.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments disclosed herein. This is done merely for convenience and to give a general sense of the inventive concepts. This description should be read to include one or at least one and the singular also includes the plural unless it is obvious that it is meant otherwise.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the drawings, and in particular to FIG. 1, a plunger lift system 10 for removing fluid, such as oil and water, from a well bore 12 is schematically illustrated. The well bore 12 is lined with a casing 14 extending downwardly from a wellhead 15. The casing 14 provides a permanent borehole through which production operations may be conducted. The casing 14 is affixed in the well bore 12 in a conventional manner, such as by cement (not shown), and is provided with perforations 16 open to a producing subterranean formation (also not shown).

The plunger lift system 10 includes a tubing string 18, a plunger 20 (FIGS. 1, 6, and 7), a bottom bumper 22, a lubricator 24, and a control valve 26. The tubing string 18 provides fluid communication between the producing subterranean formation and the surface so a reservoir fluid (not shown), for example water and/or oil and/or natural gas, is produced through the tubing string 18. The casing 14 and the tubing string 18 define an annulus 19, which also provides fluid communication through the well bore 12.

The plunger 20 is illustrated as a bypass plunger of the type including a body 27 and a shift valve 28, which when open, allows fluid to pass through the plunger 20 and thereby increase the velocity of the plunger 20 as the plunger 20 travels down the tubing. As will be described below, the shift valve 28 is caused to open by contact with a shift rod incorporated as part of the lubricator 24. The shift rod extends downwardly. The plunger 20 passes over the shift rod as the plunger 20 reaches the lubricator 24 causing the shift rod to move the shift valve 28 to the open position.

The plunger 20 is dropped into the tubing string 18. When the control valve 26 is closed, pressure may build so when the control valve 26 is opened, the plunger 20 rises to the lubricator 24 carrying the fluids to the surface. The plunger 20 returns to the bottom when the control valve 26 is closed. Through operation of the control valve 26, a liquid slug is cyclically brought to the surface of the wellbore 12 from stored gas pressure. In the off cycle, the plunger 20 falls and pressure builds again in the wellbore 12.

Referring now to FIGS. 2-5, the lubricator 24 includes a tubular body 30, a shift rod housing 32, a shift rod 34, a first spring 36, and a second spring 38. The tubular body 30 has an open end 40 connectable to the wellhead 15 in a suitable manner, such as with flanges 42 (FIG. 1) or by threads or by welding. The tubular body 30 defines a sidewall 44 and a closed end 46. The tubular body 30 may be constructed of multiple pieces, such as a body portion 48 and a cap portion 50. The body portion 48 includes one or more fluid outlets 51a and 51b. An upper end of the body portion 48 may define an interior shoulder 55. The cap portion 50 may be threadingly connected to the body portion 48 to provide access to the interior of the body portion 48. To facilitate connection to and removal from the body portion 48, the cap portion 50 has a pair of handles 52. The cap portion 50 defines the closed end 46 of the tubular body 30.

The shift rod housing 32 is disposed in the tubular body 30 and is configured to support the shift rod 34, the first spring 36, and a portion of the second spring 38. The shift rod housing 32 has an exterior shoulder 57 for supporting engagement with the interior shoulder 55 of the tubular body 30. The shift rod housing 32 has a chamber 54, a first end 56, and a second end 58. In one embodiment, the shift rod housing 32 includes a body portion 60 (FIG. 3) and a cap portion 62 (FIG. 4) to provide access to the chamber 54 so the shift rod 34 and the first spring 36 can be positioned in the shift rod housing 32. The body portion 60 has a first end 63, a second end 64, and a bore 66 having a diameter. The cap portion 62 has a first end 68 connected to the second end 64 of the body portion 60, a second end 70, and a bore 72 extending from the first end 68 of the cap portion 62 toward the second end 70 of the cap portion 62. The bore 72 of the cap portion has a diameter less than the diameter of the body portion 60.

Referring to FIG. 3, the first end 63 of the body portion 60 of the shift rod housing 32 has a bore 74, through which the shift rod 34 is slidable, and an interior shoulder 76. The body portion 60 may have a plurality of slots 78 in a sidewall 80 extending between the first end 63 and the second end 64. The slots 78 in the depicted embodiment are four equally spaced access slots 78. It will be appreciated that any number and spacing of slots 78 may be used. In one embodiment, the body portion 60 may be threadingly connected to the cap portion 62 by way of a threaded portion 82.

The first end 68 of the cap portion 62 has a flange 84 and is connectable to the body portion 60 of the shift rod housing 32. The bore 72 extends from the first end 68 of the cap portion 62 toward the second end 70 of the cap portion 62. The bore 72 of the cap portion 62 may have a diameter less than the diameter of the body portion 60 of the shift rod housing 32. A portion of the shift rod 34 may be inserted into the bore 72 of the cap portion 62 to laterally stabilize the shift rod 34. In one embodiment, the diameter of the cap portion 62 is less than the interior diameter of the cap portion 50 of the tubular body 30 so the cap portion 50 of the tubular body 30 and the cap portion 62 of the shift rod housing 32 cooperate to form a spring receiving space 86 for supporting at least a portion of the second spring 38.

Figure 2:
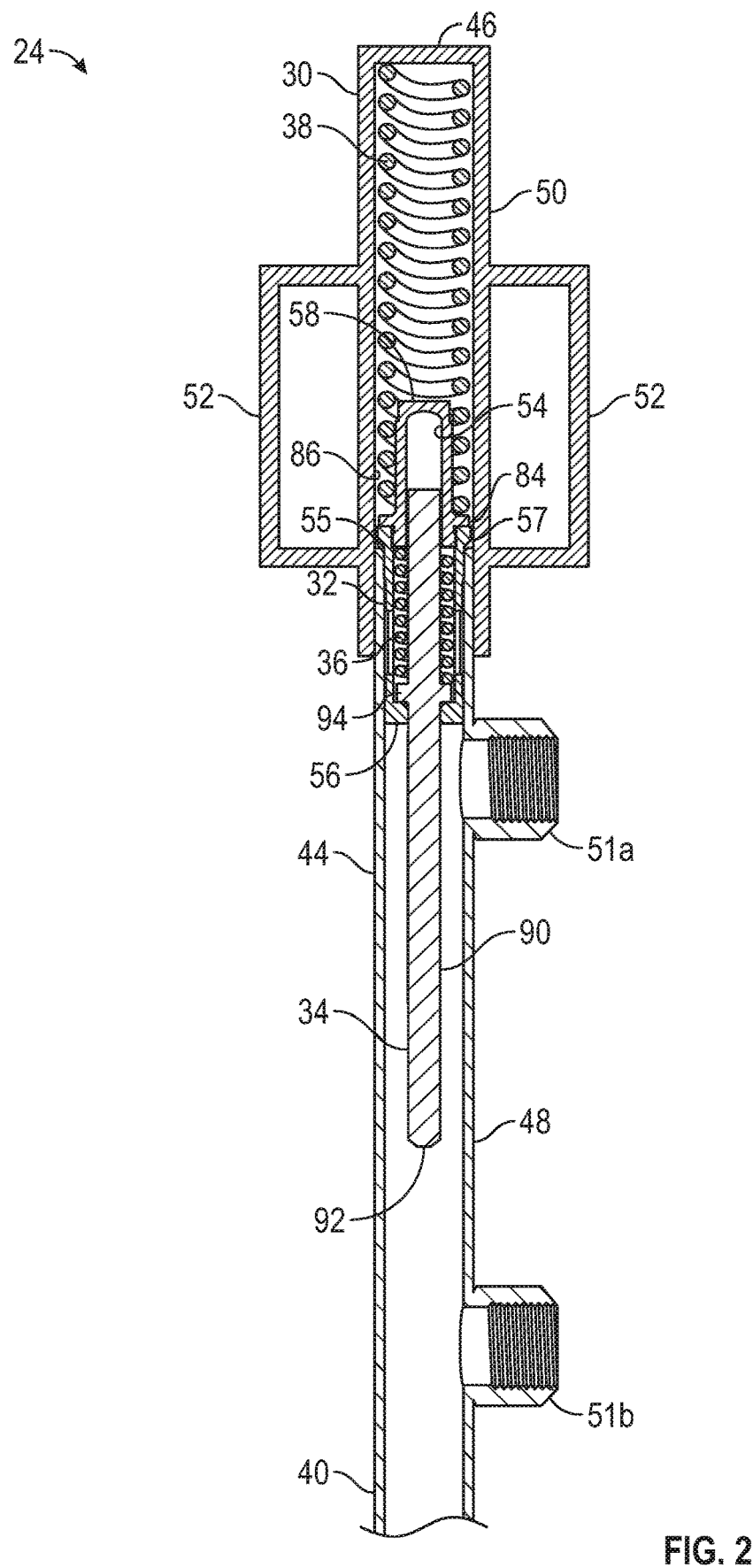
FIG. 2 is a sectional view of a lubricator constructed in accordance with the inventive concepts disclosed herein.

Referring now to FIGS. 2 and 5, the shift rod 34 has a first portion 88 slidably disposed in the chamber 54 of the shift rod housing 32 and a second portion 90 projecting from the first end 56 of the shift rod housing 32. The second portion 90 of the shift rod 34 has a diameter and length so the body 27 (FIGS. 6 & 7) of the bypass plunger 20 passes over the second portion 90 of the shift rod 34 and a distal end 92 of the shift rod 34 contacts the shift valve 28 of the bypass plunger 20 to cause the shift valve 28 to move from the closed position to the open position. The first portion 88 of the shift rod 34 has a collar 94 slidable within the chamber 54 and engageable with the interior shoulder 76 of the shift rod housing 32.

The first spring 36 is positioned between the collar 94 and the second end 58 of the shift rod housing 32. The first spring 36 is disposed in the chamber 54 of the shift rod housing 32 in a way to absorb an impact force applied to the shift rod 34 by the shift valve 28 of the bypass plunger 20. The second spring 38 is disposed in the tubular body 30 between the flange 84 of the cap portion 62 of the shift rod housing 32 and the closed end 46 of the tubular body 30 in a way to absorb an impact force applied to the shift rod housing 32 by the plunger body 27 of the bypass plunger 20. In this way, the first spring 36 is independent from the second spring 38 so as the second spring 38 is being compressed, the first spring 36 is not required to be compressed. The first spring 36 and the second spring 38 may be compression springs with the first spring 36 having a first spring rate and the second spring having a second spring rate. In one embodiment, the first spring rate is less than the second spring rate. Also, the first spring 36 has an outer diameter, and the second spring 38 has an outer diameter with the outer diameter of the first spring 36 being less than the outer diameter of the second spring 38.

Figure 6:
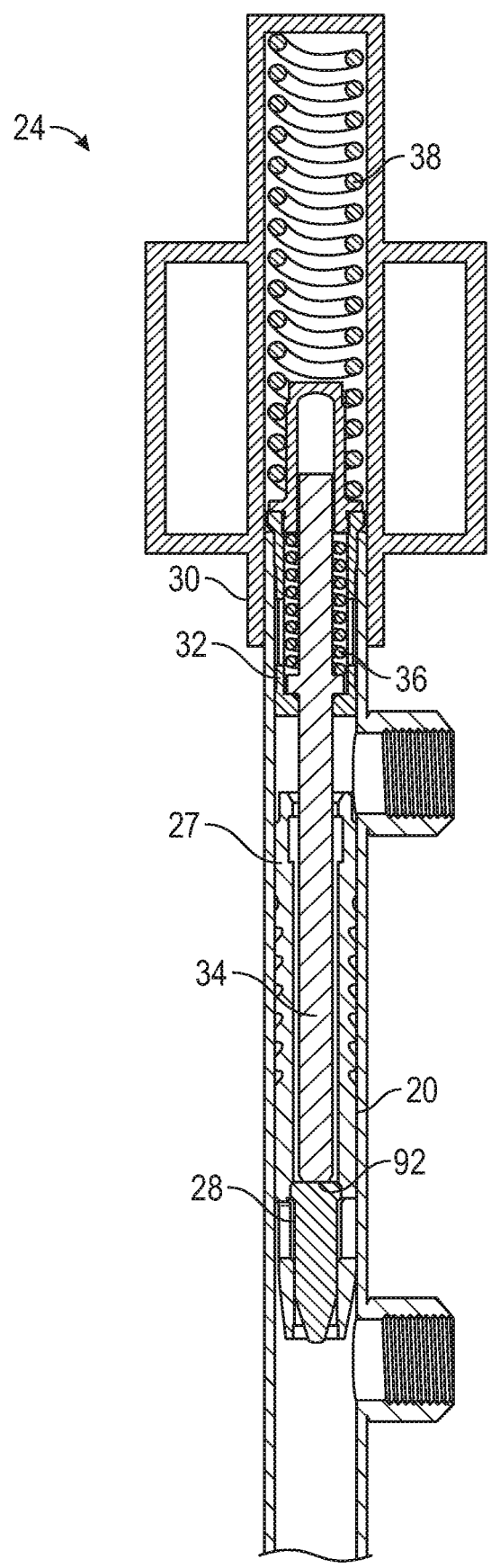
FIG. 6 is a sectional view of the lubricator illustrating a shift valve of the bypass plunger impacting an end of the shift rod.
Figure 7:
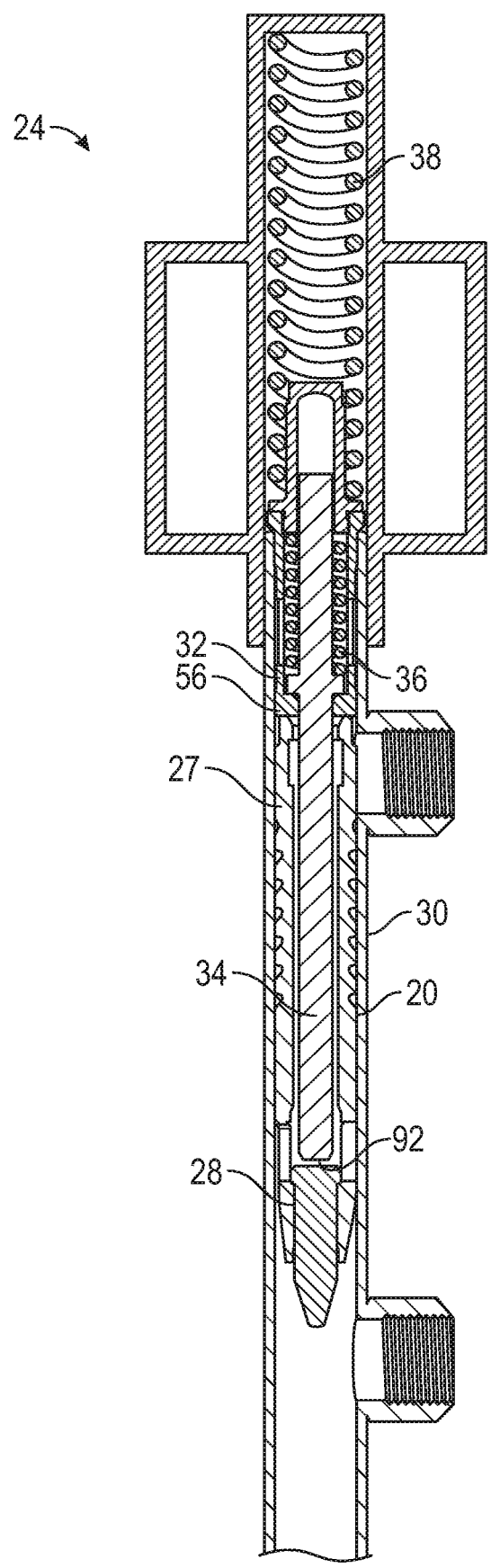
FIG. 7 is a sectional view of the lubricator illustrating a body of the bypass plunger impacting the body portion of the shift rod housing.

Referring to FIG. 6, as the bypass plunger 20 travels upwardly, the body 27 of the bypass plunger 20 passes over the shift rod 34, and the shift valve 28 contacts the distal end 92 of the shift rod 34 causing the shift valve 28 to move from the closed positioned (FIG. 6) to the open position (FIG. 7). The impact force applied to the shift rod 34 causes the shift rod 34 to slide relative to the shift rod housing 32, thus compressing the first spring 36 so the impact force to the shift rod 34 is absorbed by the first spring 36.

As shown in FIG. 7, the body 27 of the bypass plunger 20 continues to travel upwardly with the shift valve 28 now in the closed position until the body 27 of the bypass plunger 20 contacts the first end 56 of the shift rod housing 32. The impact force applied to the shift rod housing 32 causes the shift rod housing 32 to slide relative to the tubular body 30, thus compressing the second spring 38 so the impact force to the shift rod housing 32 is absorbed by the second spring 38. As shown in FIG. 7, the distal end 92 of the shift rod 34 is disengaged from the shift valve 28 as the body 27 of the plunger 20 impacts the shift rod housing 32. The result is the first spring 36 is in a non-compressed state as the second spring 38 is being compressed.

From the above description, it is clear that the inventive concepts disclosed herein are well adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the scope of the inventive concepts disclosed and as defined in the appended claims.

What is claimed is:

1. A lubricator for a plunger lift system, comprising:
   a tubular body having a sidewall and a closed end;
   a shift rod housing disposed in the tubular body, the shift rod housing having a chamber, a first end, and a second end;
   a shift rod having a first portion slidably disposed in the chamber of the shift rod housing and a second portion projecting from the first end of the shift rod housing so a distal end of the second portion of the shift rod is engageable with a shift valve of a bypass plunger;
   a first spring disposed in the chamber of the shift rod housing between the first portion of the shift rod and the second end of the shift rod housing in a way to absorb an impact force applied to the shift rod by the shift valve of the bypass plunger; and
   a second spring disposed in the tubular body between a portion of the shift rod housing and a portion of the tubular body in a way to absorb an impact force applied to the shift rod housing by a plunger body of the bypass plunger,
   wherein the shift rod housing comprises:
      a body portion having a first end from which the second portion of the shift rod projects, a second end, and a bore having a diameter; and
      a cap portion having a first end connected to the second end of the body portion, a second end, and a bore extending from the first end of the cap portion toward the second end of the cap portion, the bore of the cap portion having a diameter less than the diameter of the body portion,
      wherein the first portion of the shift rod is disposed in the bore of the body portion and the bore of the cap portion.

2. The lubricator of claim 1, where the first spring has a first spring rate and the second spring has a second spring rate, and wherein the first spring rate is less than the second spring rate.

3. The lubricator of claim 2, where the first spring has a first diameter and the second spring has a second diameter, and wherein the first diameter is less than the second diameter.

4. The lubricator of claim 1, where the first spring has a first diameter and the second spring has a second diameter, and wherein the first diameter is less than the second diameter.

5. The lubricator of claim 1, wherein the tubular body has an interior shoulder and the shift rod housing has an exterior shoulder engaged with the interior shoulder of the tubular body.

6. The lubricator of claim 1, wherein the tubular body has an interior shoulder and wherein the second end of the body has an external shoulder engaged with the internal shoulder of the tubular body.

7. The lubricator of claim 1, wherein the first spring is positioned about the first portion of the shift rod in the first bore of the body portion between the first end of the body portion and the first end of the cap portion.

8. The lubricator of claim 1, wherein the cap portion has a spring retainer portion, and wherein at least a portion of the second spring is positioned about the spring retainer portion of the cap portion.

9. A shift rod assembly for a plunger lift system, comprising:
   a shift rod housing disposable in a tubular body of a lubricator, the shift rod housing having a chamber, a first end, and a second end;
   a shift rod having a first portion slidably disposed in the chamber of the shift rod housing and a second portion projecting from the first end of the shift rod housing so a distal end of the second portion of the shift rod is engageable with a shift valve of a bypass plunger;

a first spring disposed in the chamber of the shift rod housing between the first portion of the shift rod and the second end of the shift rod housing in a way to absorb an impact force applied to the shift rod by the shift valve of the bypass plunger; and a second spring disposable between a portion of the shift rod housing and a portion of the tubular body of the lubricator in a way to absorb an impact force applied to the shift rod housing by a plunger body of the bypass plunger, wherein the shift rod housing comprises:
   a body portion having a first end from which the second portion of the shift rod projects, a second, and a bore having a diameter; and
   a cap portion having a first end connected to the second end of the body portion, a second end, and a bore extending from the first end of the cap portion toward the second end of the cap portion, the bore of the cap portion haying a diameter less than the diameter of the body portion,
     wherein the first portion of the shift rod is disposed in the bore of the body portion and the bore of the cap portion.

10. The shift rod assembly of claim 9, where the first spring has a first spring rate and the second spring has a second spring rate, and wherein the first spring rate is less than the second spring rate.

11. The shift rod assembly of claim 10, where the first spring has a first diameter and the second spring has a second diameter, and wherein the first diameter is less than the second diameter.

12. The shift rod assembly of claim 9, where the first spring has a first diameter and the second spring has a second diameter, and wherein the first diameter is less than the second diameter.

13. The shift rod assembly of claim 9, wherein the tubular body has an interior shoulder and the shift rod housing has an exterior shoulder engaged with the interior shoulder of the tubular body.

14. The shift rod assembly of claim 9, wherein the tubular body has an interior shoulder and wherein the second end of the body has an external shoulder engaged with the internal shoulder of the tubular body.

15. The shift rod assembly of claim 10, wherein the first spring is positioned about the first portion of the shift rod in the first bore of the body portion between the first end of the body portion and the first end of the cap portion.

16. The shift rod assembly of claim 9, wherein the cap portion has a spring retainer portion, and wherein at least a portion of the second spring is positioned about the spring retainer portion of the cap portion.

\* \* \* \* \*

UNITED STATES PATENT AND TRADEMARK OFFICE
CERTIFICATE OF CORRECTION

| | |
|---|---|
| PATENT NO. | : 11,754,069 B2 |
| APPLICATION NO. | : 16/548154 |
| DATED | : September 12, 2023 |
| INVENTOR(S) | : Kevin Kegin |

It is certified that error appears in the above-identified patent and that said Letters Patent is hereby corrected as shown below:

In the Claims

Column 7, Line 19: Delete "haying" and replace with --having--

Signed and Sealed this
Seventeenth Day of October, 2023

*Katherine Kelly Vidal*
Katherine Kelly Vidal
*Director of the United States Patent and Trademark Office*